US011950345B2

(12) United States Patent
Wang

(10) Patent No.: US 11,950,345 B2
(45) Date of Patent: Apr. 2, 2024

(54) METHOD FOR CONTROLLING CHEERING STICKS TO EMIT LIGHT BASED ON UWB LOCATION TECHNOLOGY

(71) Applicant: SHENZHEN BIKELOCK TECHNOLOGY CO., LTD., Shenzhen (CN)

(72) Inventor: Hongbing Wang, Shenzhen (CN)

(73) Assignee: SHENZHEN BIKELOCK TECHNOLOGY CO., LTD., Shenzhen (CN)

(*) Notice: Subject to any disclaimer, the term of this patent is extended or adjusted under 35 U.S.C. 154(b) by 170 days.

(21) Appl. No.: 17/694,709

(22) Filed: Mar. 15, 2022

(65) Prior Publication Data
US 2022/0210897 A1 Jun. 30, 2022

Related U.S. Application Data

(63) Continuation of application No. PCT/CN2020/117081, filed on Sep. 23, 2020.

(30) Foreign Application Priority Data

Sep. 24, 2019 (CN) .......................... 201910906399.2

(51) Int. Cl.
*H05B 47/155* (2020.01)
*H04W 4/02* (2018.01)
(Continued)

(52) U.S. Cl.
CPC ............ *H05B 47/19* (2020.01); *H04W 4/023* (2013.01); *H05B 47/155* (2020.01); *H05B 47/16* (2020.01)

(58) Field of Classification Search
CPC . G01S 5/00; G01S 5/0236; G01S 5/10; G01S 13/0209; H05B 47/155; H05B 47/19; H04W 4/02; H04W 4/023
See application file for complete search history.

(56) References Cited

U.S. PATENT DOCUMENTS

| 2009/0005061 A1* | 1/2009 | Ward ...................... H04W 8/08 455/566 |
| 2017/0124365 A1* | 5/2017 | Shin .......................... G01S 5/10 |
| 2021/0400427 A1* | 12/2021 | Burowski ......... H04W 74/0808 |

FOREIGN PATENT DOCUMENTS

| CN | 107635104 A | 1/2018 |
| CN | 107852531 A | 3/2018 |

(Continued)

OTHER PUBLICATIONS

International Search Report issued in corresponding International application No. PCT/CN2020/117081, dated Dec. 21, 2020.
(Continued)

*Primary Examiner* — Thai Pham

(57) ABSTRACT

The invention discloses a method for controlling cheering sticks to emit light based on a UWB location technology, First, setting location base stations, and generating a wireless local area network by the location base stations to cover a target area; next, after cheering sticks are connected to the location base stations through the wireless local area network, calculating positions of the cheering sticks according to signals sent by the location base stations; and converting the position coordinates into display coordinates according to a stadium seat mapping table obtained from the base stations; and finally, acquiring, by the cheering sticks, animation data from the location base stations, calculating play sequences of the cheering sticks according to the animation data and the display coordinates, acquiring, by the cheering sticks, play times from the base stations, and synchronously playing the play sequences to realize animation play of a whole cheering stick array.

9 Claims, 6 Drawing Sheets

(51) Int. Cl.
*H05B 47/16* (2020.01)
*H05B 47/19* (2020.01)

(56) References Cited

FOREIGN PATENT DOCUMENTS

| CN | 109685942 A | | 4/2019 |
|----|-------------|---|--------|
| CN | 110024400 A | | 7/2019 |
| CN | 110177133 A | * | 8/2019 |
| CN | 110177133 A | | 8/2019 |

OTHER PUBLICATIONS

Written Opinion of the International Searching Authority for No. PCT/CN2020/117081.

* cited by examiner

| i1*, j1* | i2*, j1* | i3*, j1* |          |  |  | in*, j1* |
|----------|----------|----------|----------|--|--|----------|
| i1*, j2* |          |          |          |  |  |          |
| i1*, j3* |          |          |          |  |  |          |
|          |          |          | it*, jt* |  |  |          |
|          |          |          |          |  |  |          |
| i1*, jn* |          |          |          |  |  | in*, jn* |

12

12

METHOD FOR CONTROLLING CHEERING STICKS TO EMIT LIGHT BASED ON UWB LOCATION TECHNOLOGY

BACKGROUND OF THE INVENTION

1. Technical Field

The invention relates to the technical field of communication, in particular to a method for controlling cheering sticks to emit light based on a UWB location technology.

2. Description of Related Art

In a large-scale concert or match, light sticks (also referred to as cheering sticks) are given to audience by field personnel upon entry. The audience can wave their cheering sticks to cheer for the teams they like, or shout for the singers they like, so as to promote the atmosphere of the whole concert or match. However, existing cheering sticks have the following defects: first, the cheering sticks can only emit light in one color; and second, the cheering sticks of the audience are independent and cannot be combined to fulfill an overall effect.

BRIEF SUMMARY OF THE INVENTION

The objective of the invention is to overcome the defects of the prior art by providing a method for controlling cheering sticks to emit light based on a UWB location technology, which controls the cheering sticks to emit specific light in different sequences through a control center, so to combine the light emitted by the cheering sticks in a whole area into a specific image to fulfill a large-scale display effect or an animation playing effect, thus further igniting the atmosphere of a whole scene.

To fulfill the above objective, the invention provides a method for controlling cheering sticks to emit light based on a UWB location technology, comprising:

Setting location base stations, and generating a wireless local area network by the location base stations to cover a target area;

After cheering sticks are connected to the wireless local area network generated by the base stations, acquiring beacons from the location base stations, and calculating positions of the cheering sticks to obtain position coordinates; and converting the position coordinates of the cheering sticks into display coordinates in a cheering stick array formed by the cheering sticks; and Acquiring animation data from the location base stations by the cheering sticks, calculating play sequences of the cheering sticks according to the animation data and the display coordinates, and playing the play sequences synchronously to realize animation play of the cheering stick array.

Wherein, when the position coordinates of the cheering sticks are acquired, the cheering sticks receive location beacons sent by the location base stations first, and then the position coordinates of the cheering sticks are calculated through a TDOA algorithm.

Wherein, when the position coordinates of the cheering sticks are calculated through the TDOA algorithm, a stadium seat mapping table sent by the location base stations is received first, wherein the stadium seat mapping table comprises position coordinates of all the location base stations in a stadium; and the positions of the cheering sticks with respect to the location base stations are calculated first, and then the position coordinates of the cheering sticks are obtained according to the positions of the location base stations.

Wherein, when the position coordinates of the cheering sticks are converted to the display coordinates in the cheering stick array formed by the cheering sticks, a stadium seat mapping table sent by the location base stations is received first, wherein the stadium seat mapping table comprises position coordinates and a display coordinate mapping table; and the position coordinates of the cheering sticks are converted into corresponding display coordinates according to the display coordinate mapping table.

Wherein, after the cheering sticks acquire the animation data from the location base stations, the play sequences of the cheering sticks are calculated according to the display coordinates of the cheering sticks.

Wherein, the cheering sticks receive play time signals sent by the location base stations before emitting light in order, wherein the play time signals are used to control the cheering sticks to start to emit light at a specific time.

To fulfill the above objective, the invention further provides a method for controlling cheering sticks to emit light based on a UWB technology, comprising:

Setting location base stations, and generating a wireless local area network by the location base stations to cover a target area;

Sending, by the location base stations, location beacons to all cheering sticks, wherein the location beacons are used to calculate position coordinates of the cheering sticks; and Sending, by the location base stations, animation data to the cheering sticks, wherein the animation data is used to enable a cheering stick array to emit light to realize animation play.

Wherein, when the location base stations are set, the number of the location base stations is at least four.

Wherein, the location base stations also send a stadium seat mapping table to the cheering sticks when sending the location beacons to all the cheering sticks, wherein the stadium seat mapping table comprises position coordinates and a display coordinate mapping table.

Wherein, the location base stations also send play time signals to the cheering sticks after sending the animation data to the cheering sticks, and the play time signals are used to control the cheering sticks to start to emit light at a specific time.

Wherein, at least one of the location base stations is a main location base station which is in a communication connection with main control equipment, and the other location base stations are all in a communication connection with the main location base station; when the location base stations send signals to the cheering sticks, the main location base station receives a signal from the main control equipment first and transmits the signal to the other location base stations, and then the main location base station or/and the location base stations transmit the signal to the cheering sticks.

The invention has the following beneficial effects: according to the method for controlling cheering sticks to emit light based on a UWB location technology, location base stations are set first to generate a wireless local area network to cover a target area; then, after cheering sticks are connected to the location base stations through the wireless local area network, position coordinates of the cheering sticks are obtained according to signals sent by the location base stations, and the position coordinates are converted into display coordinates according to a stadium seat mapping table; and finally, the cheering sticks acquire animation data from the location base stations, a play sequence of the cheering sticks is calculated according to the animation data and the display coordinates, and the cheering sticks are played synchronously to realize animation play of a cheering stick array. Compared with existing cheering sticks which emit light independently, the invention controls the cheering sticks to emit light according to the play sequence, so that the light emitted by the cheering sticks in a whole area forms a specific image to realize a large-scale display effect or an animation play effect, thus further igniting the atmosphere of the whole scene. Seats where fans sit do not need to be classified or numbered in advance.

DETAILED DESCRIPTION OF THE INVENTION

To more clearly explain the invention, the invention will be further described below in conjunction with the accompanying drawings.

Light sticks are linear sticks capable of emitting light in dark, and have been widely applied in many scenarios such as night fishing, wedding celebrations, outdoor activities, concerts and matches. Traditional light sticks emit light based on the following principle: a peroxide and an ester compound are contained in an interlayer of the light sticks and react with each other, after glass is broken by bending, hitting or twisting, to enable a fluorochrome to emit light. However, such chemluminescent light sticks are disposable and cannot be used repeatedly. In view of this, light sticks using light beads to emit light are developed and can be used repeatedly after being charged. Such light sticks (cheering sticks) typically comprise several light-emitting diodes, a battery, a circuit board, and an on-off switch, are generally in a bar shape or other shapes, and can only be turned on or off.

However, all these light sticks are used independently and cannot fulfill an overall effect. Particularly in a large-scale concert or match, audience off stage wave their cheering sticks to set off a lively atmosphere on a whole scene. However, due to the large area of a stadium and the large number of audience, the cheering stick of each audience member seems like a light point when seen from a distance or from above, and light emitted by all the light points is out of order. If the light points emit light in a specific rule, each light point is equivalent to a pixel point on a display screen, and when the pixel points emit light in a specific rule, a whole auditorium 12 will turn into a large display screen to play an image, thus further igniting the atmosphere of the whole concert or match.

Figure 1:
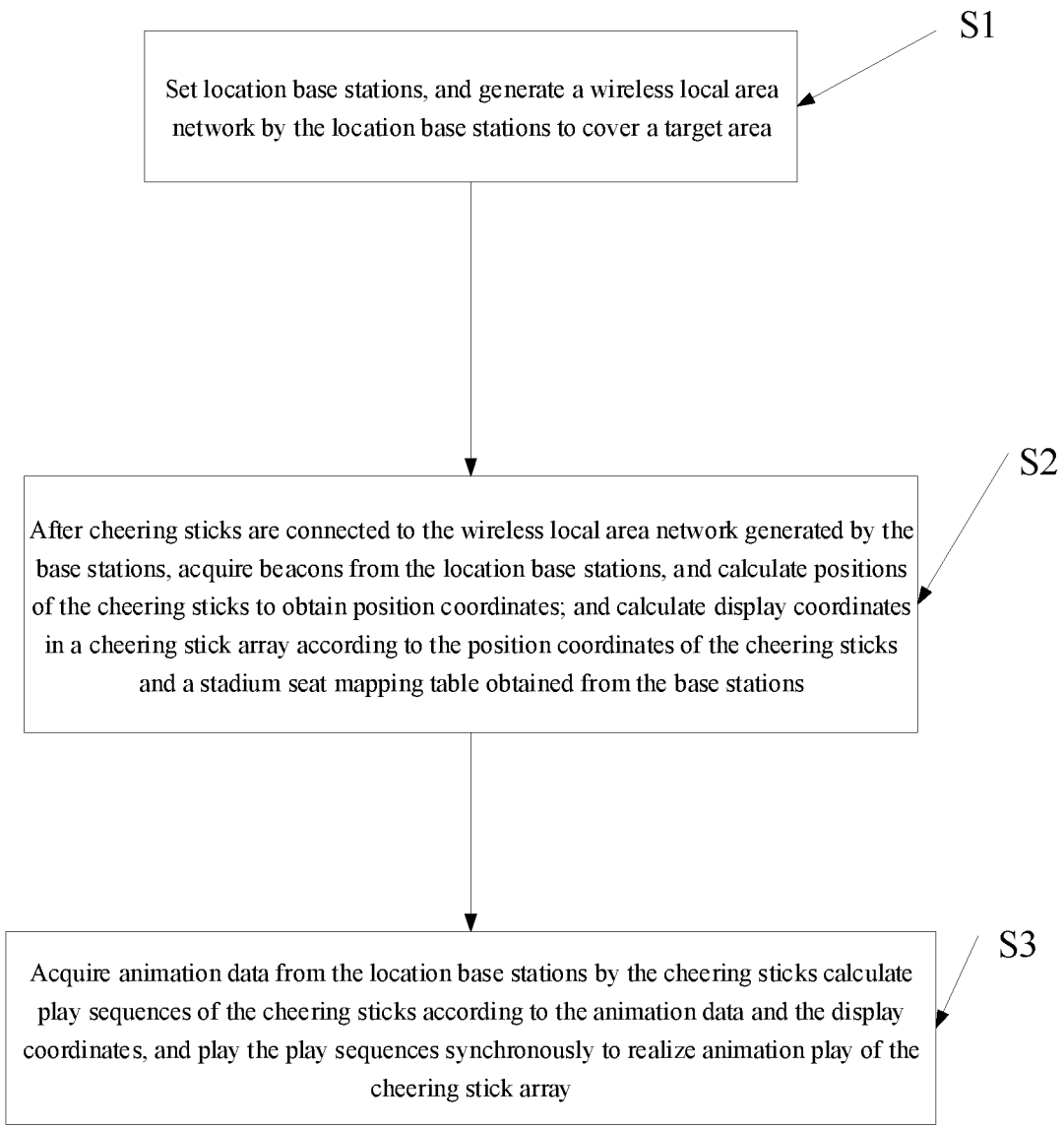
FIG. 1 is an overall flow diagram of the invention.
Figure 2:
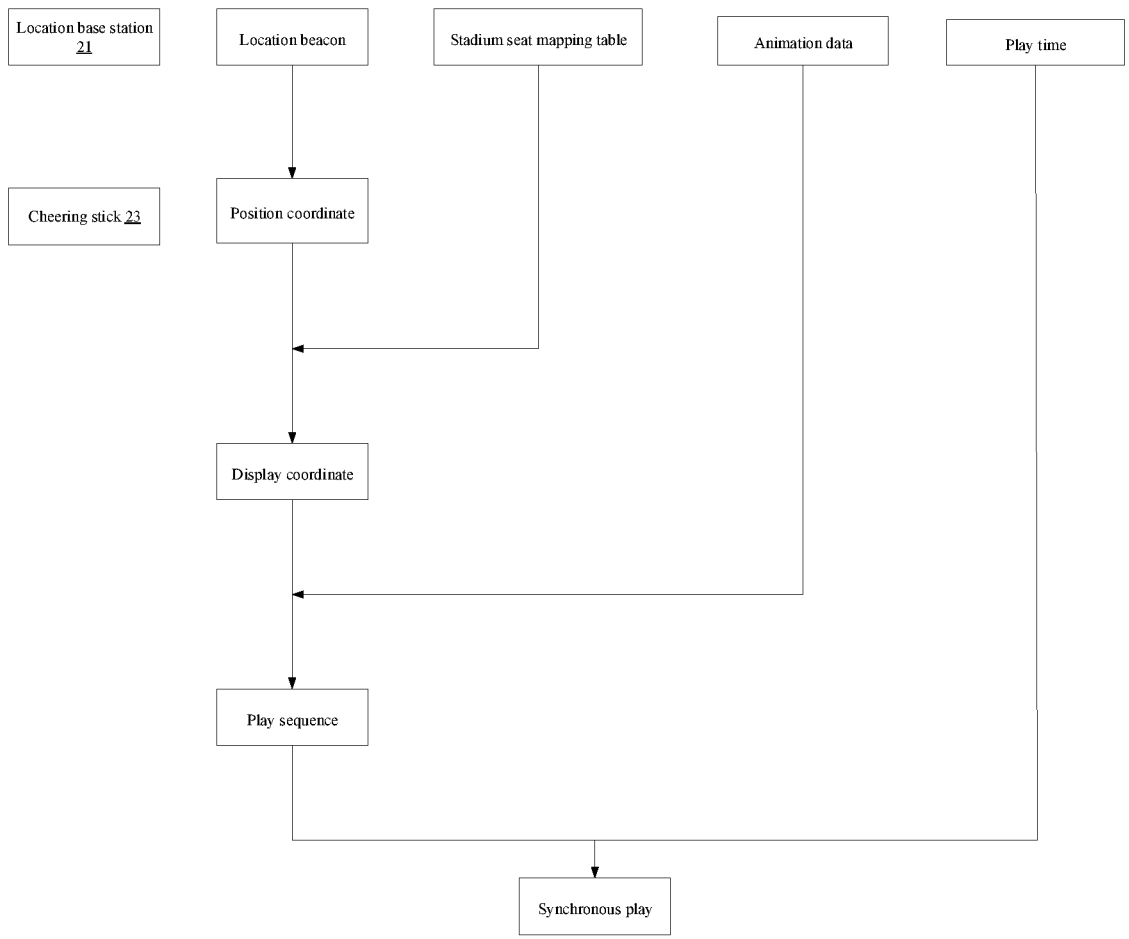
FIG. 2 is a detailed flow diagram of the invention.
Figure 3:
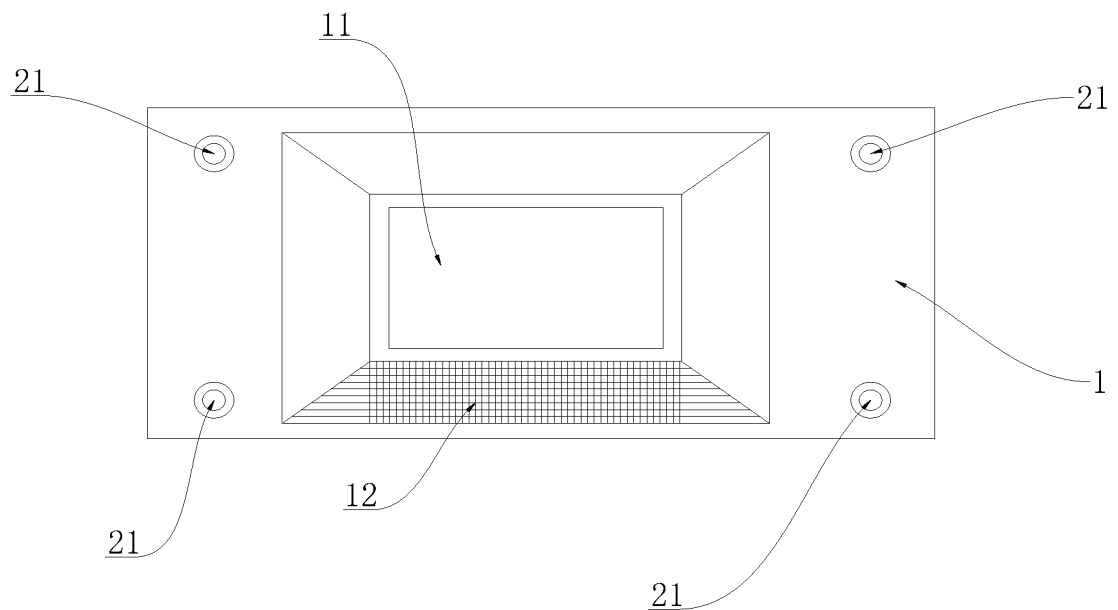
FIG. 3 is a distribution diagram of a stadium of the invention.

Referring to FIG. 1-FIG. 3, a method for controlling cheering sticks 23 to emit light based on a UWB location technology comprises the following steps:

S1: location base stations 21 are set and generate a wireless local area network to cover a target area;

S2: after being connected to the wireless local area network generated by the base stations, the cheering sticks 23 acquire beacons through the location base stations 21, and positions of the cheering sticks 23 are calculated to obtain position coordinates; and then, the position coordinates of the cheering sticks 23 are converted into display coordinates in a cheering stick 23 array formed by the cheering sticks 23 according to a stadium seat mapping table;

S3: the cheering sticks 23 acquire animation data from the location base stations 21, play sequences of the cheering sticks 23 are calculated according to the animation data and the display coordinates, and the play sequences are played synchronously to realize animation play of the cheering stick 23 array.

After the location base stations 21 are set, a stadium where a match or a concert is held is surveyed and mapped to obtain the sizes of the stadium and position information of an auditorium 12, a stage 11 and the location base stations 21 in the stadium. For example, a position coordinate system is established with a corner of the stadium as the origin of the coordinate system; then, coordinate values of seats in the auditorium 12 in the position coordinate system are obtained; and coordinate values of the local base stations 21 in an absolute base station are measured to obtain a stadium seat mapping table, and the stadium seat mapping table is stored in main control equipment 22 after being made.

When the base stations are set, the wireless local area network generated by the base stations should be able to completely cover the stadium, so that any point covered by the wireless local area network can be located by the base stations; after the base stations are set, the cheering sticks 23 (light sticks) are given to audience when the audience enter the stadium, and the audience may sit at any position in the stadium; the base stations are able to locate any cheering stick 23, and seats where the fans sit do not need to be classified or numbered in advance; and after all the audience have a seat, the positions of the cheering sticks 23, held by the audience, in a whole cheering stick 23 array are calculated according to the location base stations 21; and finally, the cheering sticks 23 emit light regularly according to received animation data, so that an animation is played by the whole auditorium 12 like a display screen.

Figure 4:
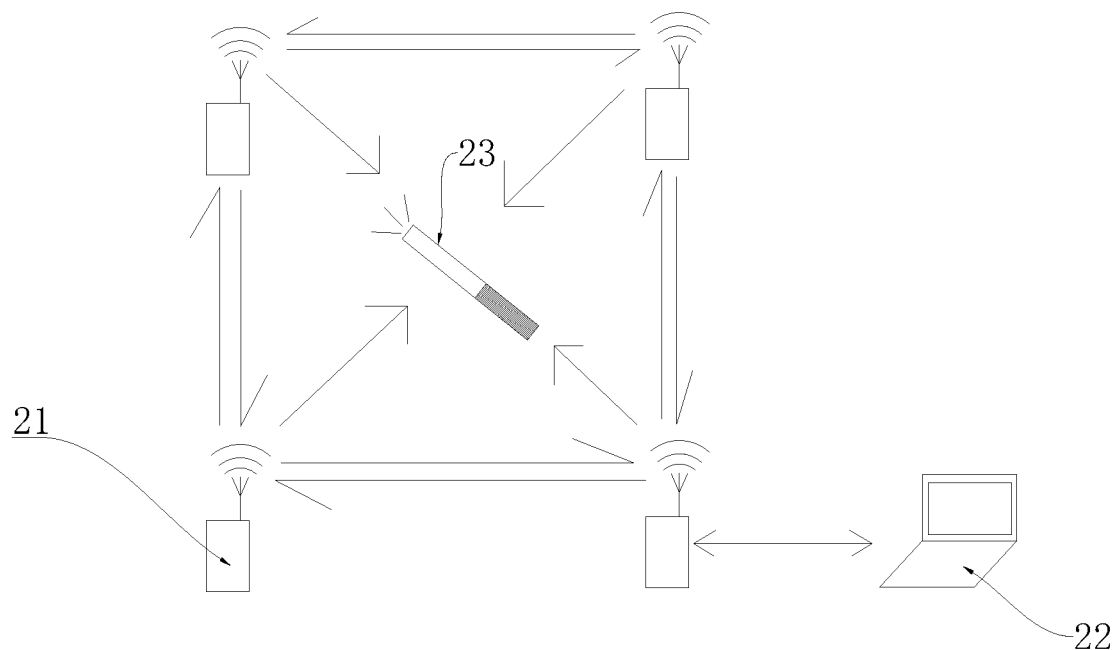
FIG. 4 is a system principle diagram of the invention.
Figure 5:
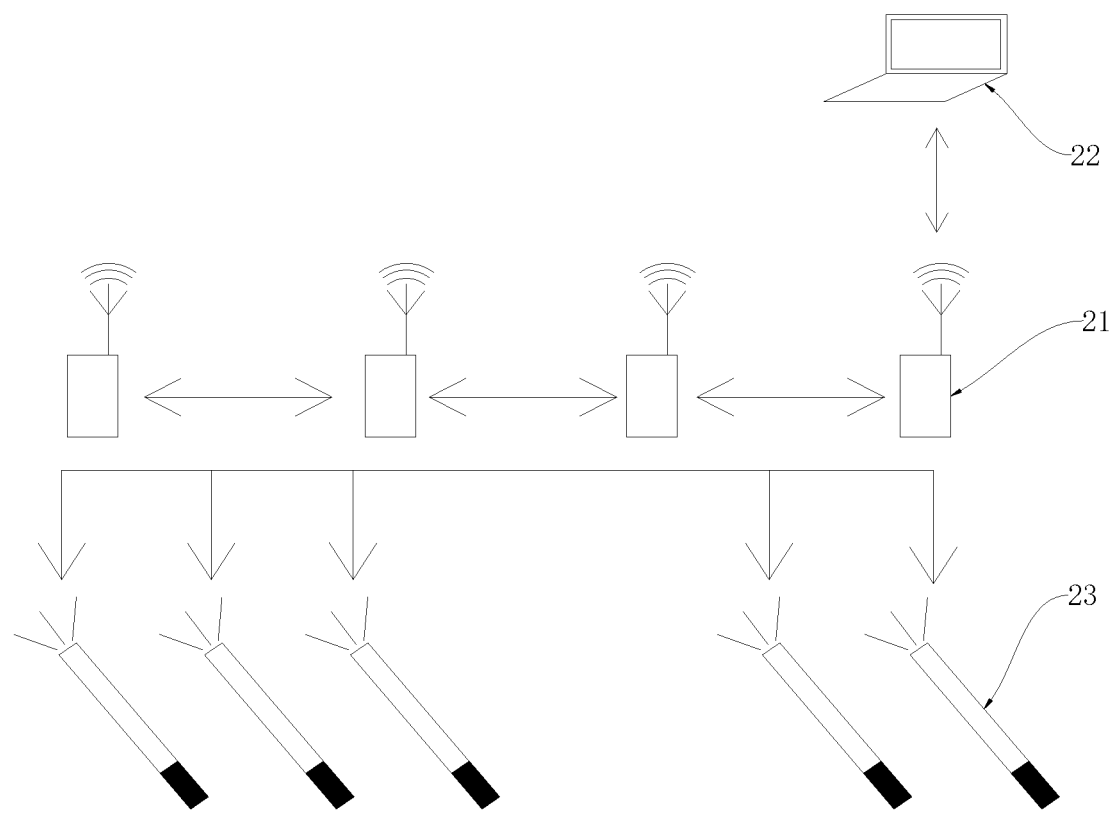
FIG. 5 is a system framework diagram of the invention.

Referring to FIG. 4 and FIG. 5, the cheering sticks 23 are located through a UWB (Ultra Wide Band) location technology, which is a carrier-free communication technology that transmits data by means of nanosecond-level non-sinusoidal narrow pulses, thus having a wide spectral range. UWB location adopts the wide-band pulse communication technology and has an extremely high anti-interference capacity, thus reducing location errors. The UWB indoor location technology fills in a blank in the field of high-accuracy location, and has the advantages of being insensitive to channel fading, low in power spectral density of transmitted signals, low in interception capacity, low in system complicity, and capable of providing centimeter-level location accuracy.

In this embodiment, the cheering sticks 23 are provided with UWB location tags, and the UWB location tags are active tags that may be fixed on objects or vehicles or worn by people in different forms, and are variable in different application scenarios. In this embodiment, the active tags are fixed on the cheering sticks 23, and the location accuracy of the active tags may reach 5-10 cm; each active tag has a unique ID which is bound with one cheering stick 23, and after the tag receives signals sent by the location base stations, display coordinates of the cheering stick 23 with this ID are obtained by calculation; and the signal sent by the same base station may be synchronously received by tens of thousands of cheering sticks 23.

When the position coordinates of the cheering sticks are acquired in S2, the cheering sticks receive location beacons sent by the location base stations first, and then the position coordinates of the cheering sticks are calculated through a TDOA algorithm.

In this embodiment, the distances from the active tags to the location base stations 21 can be determined by the location base stations 21 through a TDOA measurement technology, and the location accuracy reaches the centimeter level. Due to the fact that the width of the seats in the auditorium 12 is about 45-55 cm, that is, the distance between the adjacent cheering sticks 23 is about 50 cm, the cheering sticks 23 will not be located to adjacent seats, and completely accurate location is guaranteed.

In this embodiment, at least four location base stations are used for TDOA location, namely hyperbolic location. A difference between the distances from each tag to every two base stations is measured, a hyperbola is drawn according to the difference which is a constant, and the coordinates of the tag are determined according to an interaction point of all the hyperbolae.

When the position coordinates of the cheering sticks are calculated according to the TDOA algorithm, the cheering sticks receive a stadium seat mapping table sent by the location base stations first, wherein the stadium seat mapping table comprises position coordinates of all the seats in the stadium and has a one-to-one corresponding relationship with the display coordinates; and the position coordinates of the cheering sticks are calculated first, and then, the display coordinates of the cheering sticks are calculated according to the stadium seat mapping table.

Figure 6:
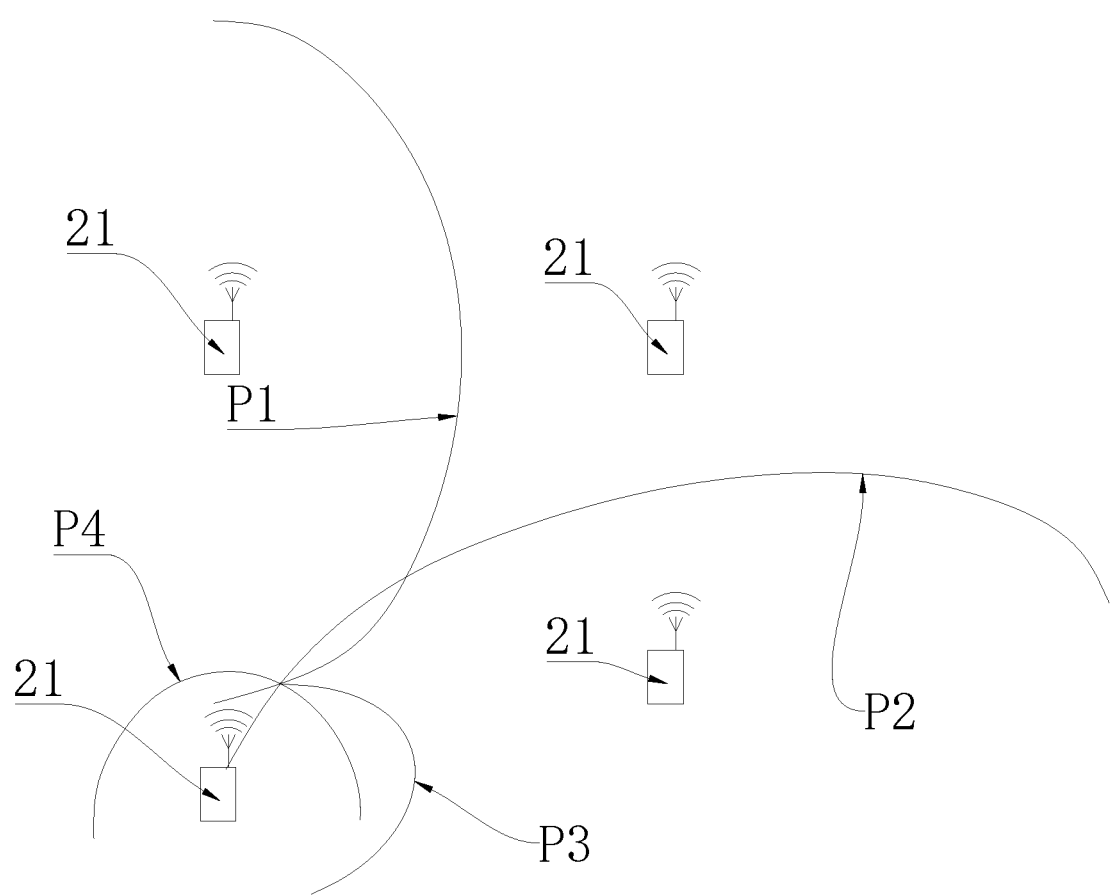
FIG. 6 is a schematic diagram for determining the positions of cheering sticks through three base stations of the invention.

Referring to FIG. 6, after the location base stations send UWB beacon signals to the cheering sticks, a difference between the distances from each cheering stick to every two base stations is obtained according to a difference between the times when the cheering stick 23 receives the location beacons from these two base stations, a hyperbola is drawn according to the difference between the distances, and an interaction point of all hyperbolas is a unique position of the cheering stick 23; wherein, before the location base stations send the location beacons, the times of the base stations are synchronous. The UWB location technology is a mature location technology, so the principle of the UWB location technology is briefly introduced here. According to a difference t1 between the time when the cheering stick 23 with an ID a1 receives a location beacon sent by a first base station and the time when the cheering stick 23 with the ID a1 receives a location beacon sent by a second base station, a difference d1 between the distance from this cheering stick to the first base station and the distance from this cheering stick to the second base station is obtained, and a first hyperbola with the first base station as a first focal point and the second base station as a second focal point is obtained using d1 as a distance difference; A difference d2 between the distance from this cheering stick 23 to the first base station and the distance from this cheering stick 23 to a third base station is obtained according to a difference t2 between the time when this cheering stick 23 receives the location beacon sent by the first base station and the time when this cheering stick 23 receives a location beacon sent by the third base station, and a second hyperbola with the first base station as the first focal point and the third base station as a second focal point is obtained using d2 as a distance difference; A difference d3 between the distance from this cheering stick 23 to the first base station and the distance from this cheering stick 23 to a fourth base station is obtained according to a difference t3 between the time when this cheering stick 23 receives the location beacon sent by the first base station and the time when this cheering stick 23 receives a location beacon sent by the fourth base station, and a third hyperbola with the first base station as the first focal point and the third base station as a second focal point is obtained using d3 as a distance difference; the three hyperbolas intersect at a unique point which is the position where the cheering stick 23 with the ID a1 is located; after the unique position of this cheering stick 23 is determined, the positions of the cheering stick 23 with the ID a1 with respect to the base stations are obtained; and finally, the position coordinates (x1, y1) of this cheering stick 23 with the ID a1 in a stadium map are obtained according to position coordinates of the base stations.

In this embodiment, because the position coordinate system is established with a corner or a special point in the stadium map, which is drawn in advance, as the origin of coordinates, the coordinates of the location base stations 21 in the position coordinate system are fixed, and the coordinates (x1, y1) of the cheering stick 23 with the ID a1 in the position coordinate system are obtained after the unique positions of the cheering stick 23 with respect to the location base stations 21 are determined. In this embodiment, the position coordinates are calculated by a device inside the cheering stick 23.

In S2, when the position coordinates of the cheering sticks 23 are converted into the display coordinates in the cheering stick array formed by the cheering sticks, a stadium seat mapping table sent by the location base stations is received first, wherein the stadium seat mapping table comprises position coordinates and a display coordinate mapping table; and the position coordinates of the cheering sticks are converted into the corresponding display coordinates according to the mapping table.

In this embodiment, the position coordinates of all seats have been drawn in the mapping table in advance and are combined to form an array, and each seat corresponds to one cheering stick 23 at most after audience have their seat, so the array of the seats is the cheering stick 23 array.

Figure 7:
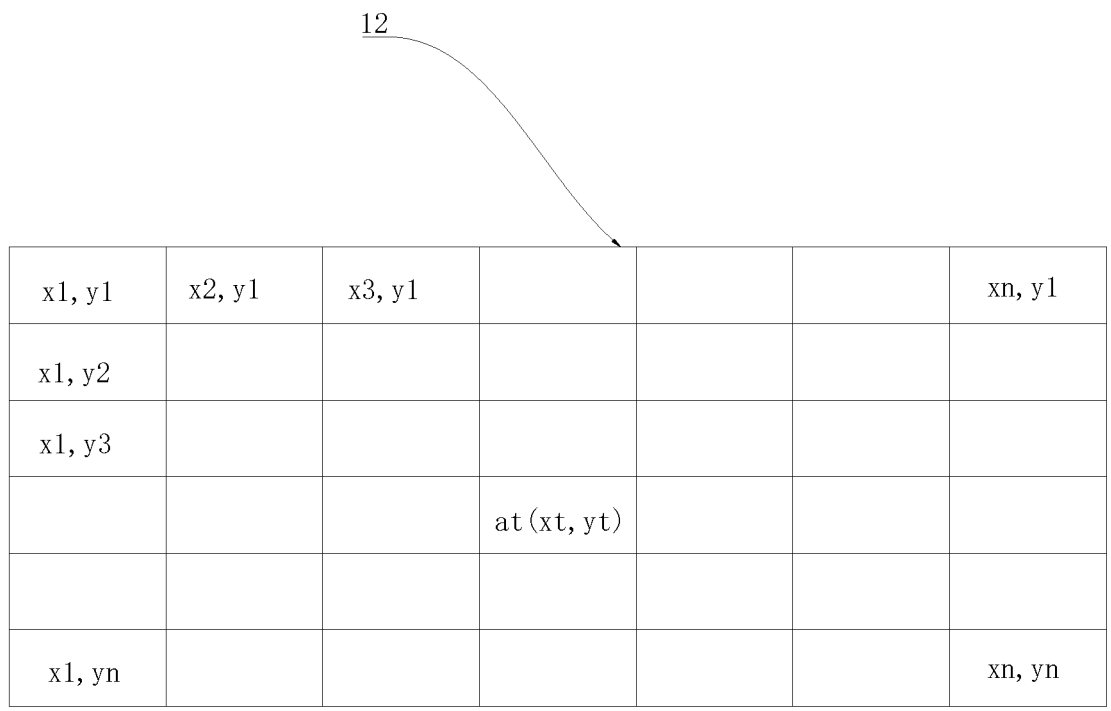
FIG. 7 is a distribution diagram of position coordinates of seats of the invention.
Figures 8, 9:
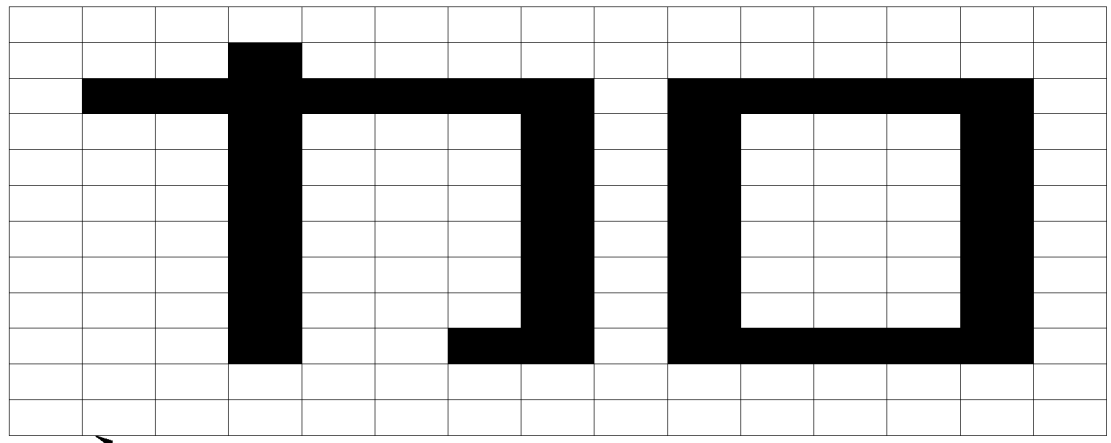
FIG. 8 is a distribution diagram of display coordinates corresponding to position coordinates of the invention.
FIG. 9 is a simple schematic diagram of animation play of the invention.

Referring to FIG. 7-FIG. 8, after the position coordinates of each cheering stick 23 are obtained through the base stations, it can be figured out that the cheering sticks 23ID corresponding to the seats with the position coordinates (x1, y1), (x2, y2), . . . , and (xn, yn) are respectively a1, a2, . . . , and an. That is to say, the positions of the cheering sticks with IDs a1, a2, . . . , and an in the cheering stick 23 array are determined after being measured by the location base stations 21. After the positions of the cheering sticks with IDs a1, a2, . . . , and an in the cheering stick 23 array are determined, relative coordinates of the cheering sticks 23 with IDs a1, a2, . . . , and an can be obtained according to the position coordinates and a display coordinate mapping table. For example, the display coordinates of the cheering stick 23 with the position coordinates (x1, y1) are (It*, Jt*), and the ID of the cheering stick 23 with the position coordinates (x1, y1) is at, so it can be figured out that the display coordinates of the cheering stick with the ID at are (It*, Jt*), and the display coordinates indicate the position of the cheering stick 23 in the whole cheering stick 23 array. If the whole cheering stick 23 array is regarded as a display screen, the display coordinates indicate the position of the cheering stick 23 with the ID at, as a pixel, in the display screen. The IDs the cheering sticks on all the seats can be obtained according to the display coordinates of all the cheering sticks 23.

After the IDs of the cheering sticks 23 on all the seats are obtained, the cheering sticks 23 acquire animation data from the location base stations 21 and generate play sequences according to the display coordinates. Wherein, the play sequences of the cheering sticks are figured out from the animation data according to the display coordinates of the cheering sticks and are one-dimensional data varying with time. The light-emitting state of the cheering sticks 23 is controlled according to the play sequences, like the pixels emitting light in a rule on the display screen, so that an overall animation play effect is fulfilled.

In this embodiment, the cheering sticks receive play time signals sent by the location base stations before emitting light in order, and the play time signals are used to control the cheering sticks to start to emit light at a specific time. Wherein, the play time refers to the play time of specific animation data included in information sent by the base stations, and at this time, all the cheering sticks synchronously play their play sequences figured out from the same animation data. That is, all the cheering sticks start to emit light at the same time according to a check signal.

Referring to FIG. 9, if the acquired animation data is "加油", the cheering sticks 23 for providing a background color just need to emit white light all the time, and the cheering sticks for forming the words need to emit red light for one second and then emit blue light for one second. The display coordinates of the cheering sticks 23 for providing the background color are (Iw1*, Jw1*), (Iw2*, Jw2*), . . . , and (Iwn*, Jwn*), the IDs of the corresponding cheering sticks 23 are aw1, aw2, . . . , and awn respectively, the display coordinates of the cheering sticks 23 for forming the words are (Ir1*, Jr1*), (Ir2*, Jr2*), . . . , and (Irn*, Jrn*), the IDs of the corresponding cheering sticks 23 are ar1, ar2, and arw respectively, cheering sticks 23 with the IDs aw1, aw2, . . . , and awn emit white light all the time, and the cheering sticks with the IDs ar1, ar2, . . . , and arw emit red light for one second and then emit blue light for one second, so that the animation data is played.

The invention further provides a method for controlling cheering sticks 23 to emit light based on a UWB location technology, comprising:

Location base stations 21 are set, and a wireless local area network is generated by the location base stations 21 to cover a target area;

The location base stations 21 send location beacons to all the cheering sticks 23 synchronously, wherein the location beacons are used to calculate position coordinates of the cheering sticks 23;

The location base stations 21 send animation data to the cheering sticks 23, wherein the animation data is used to enable a cheering stick 23 array to emit light to realize animation playing.

In this embodiment, when the location base stations are set, the number of the base stations is at least four. At least one of the location base stations 21 is a main location base station 211 which is in a communication connection with main control equipment 22, and the other location base stations 21 are all in a communication connection with main location base station 211. The main location base station 211 receives animation data transmitted from the main control equipment 22, such as a piece of animation data "XXX team will prevail"; after the animation data is transmitted from the main control equipment 22 to the main location base station 211, the main location base station 211 sends the animation data to the other base stations through a broadcast channel, and then the location base stations 21 transmit the animation data to the cheering sticks 23.

In this embodiment, because the cheering sticks 23 can receive signals sent by multiple location base stations 21, the base stations send animation data to the cheering sticks 23 respectively and sequentially; the animation data sent by each base station has an identification number; and when the cheering sticks 23 receive the animation data sent by any one base station, this cheering sticks 23 will no longer receive animation data sent by other base stations.

In this embodiment, the main control equipment 22 is connected to the main location base station 211 in a wired manner or a wireless manner, and the base stations communicate with each other; before the location base stations 21 send the animation data to the cheering sticks 23, and the main location base station 211 receives animation data transmitted from the main control equipment 22 first and then transmits the animation data to the other location base stations 21. For example, after the animation data sent from the main control equipment is transmitted to the main location base station 211, the main location base station 211 transmits the animation data to a location base station 21 in direct communication with the main location base station 211, then the location base station 21 connected to the main location base station 211 transmits the animation data to other location base stations 21 connected thereto, and then the location base stations 21 transmit the animation data to the cheering sticks 23 in sequence.

In this embodiment, after sending the animation data to the cheering sticks, the location base stations also send play time signals to the cheering sticks to control all the cheering sticks to emit light at the same time. In this way, it is ensured that all the cheering sticks emit light at the same time according to play sequences to fulfill an overall display effect. If the cheering sticks start to emit light at different times, the display effect will be disordered even if the cheering sticks emit light according to the play sequences.

Figure 10:
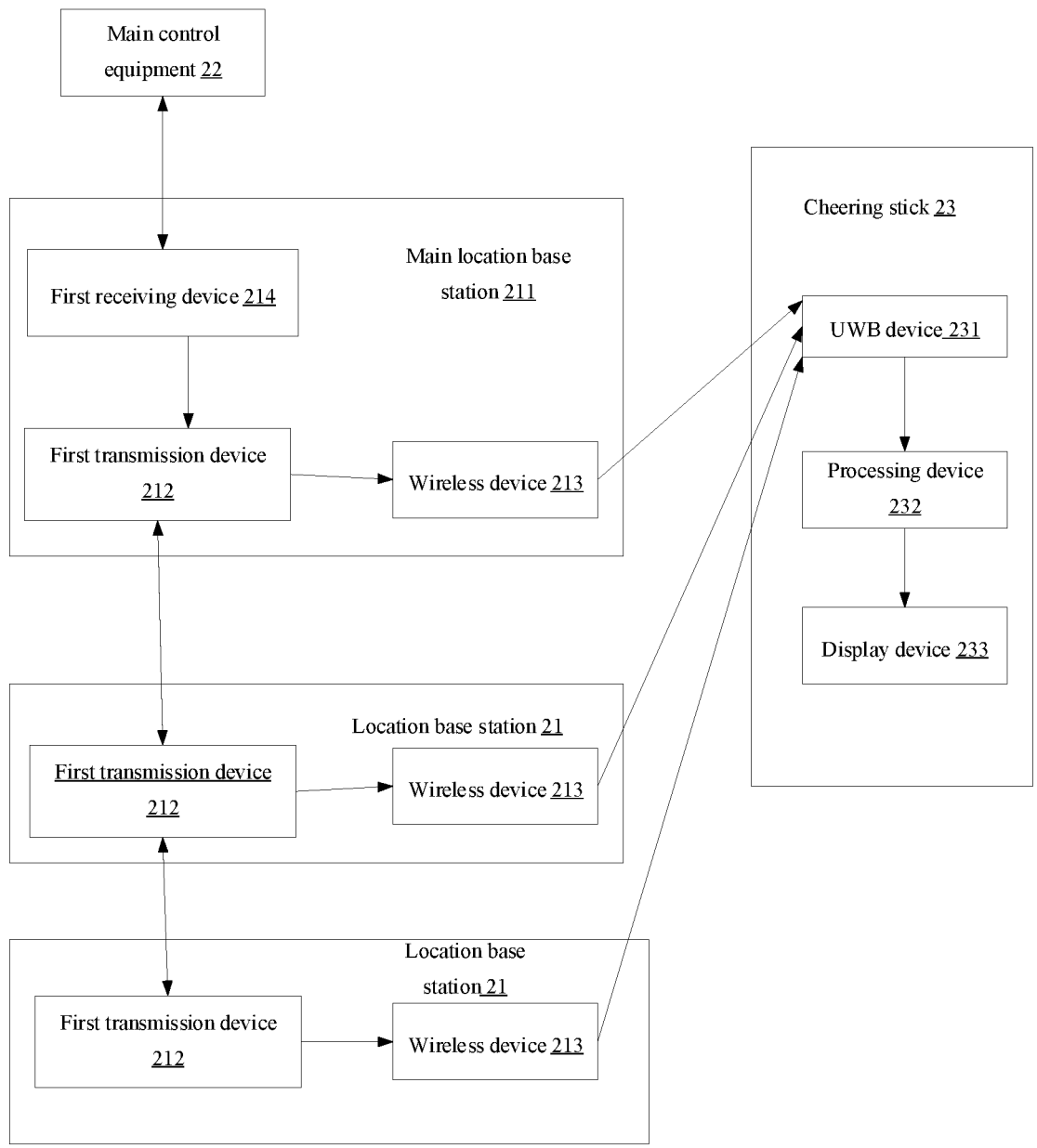
FIG. 10 is a block diagram of the invention.
Reference signs of main components:
11, stage; 12, auditorium; 21, location base station; 22, main control equipment; 23, cheering stick; 211, main location base station; 212, first transmission device; 213, wireless device; 214, first receiving device; 231, UWB device; 232, processing device; 233, display device.

Referring to FIG. 10, a system for controlling cheering sticks 23 to emit light based on a UWB technology, comprising:

Location base stations 21 comprising wireless devices 213, the wireless devices 213 generating a wireless local area network to cover a target area;

Each cheering stick 23 comprises a UWB device 231, a processing device 232 and a display device 233. After the UWB devices 231 are connected to the wireless local area network generated by the base stations, the processing devices 232 calculate the positions of the cheering sticks 23 with respect to the base stations to obtain position coordinates; and then, the position coordinates of the cheering sticks 23 are converted into display coordinates in a cheering stick 23 array formed by the cheering sticks 23;

The UWB devices 231 acquire animation data from the local base stations 21, and the processing devices 232 control the display devices 233 to emit light according to the animation data and the display coordinates, so that animation play of the cheering stick 23 array is realized.

In this embodiment, at least four location base stations 21 are set. Wherein, each location base station 21 comprises a first transmission device 212. At least one of the location base stations 21 is a main location base station 211, which comprises a first receiving device 214 and is in a communication connection with main control equipment 22 through the first receiving device 214. The other location base stations are in communication with the main location base station 211 through the first transmission devices 212.

In this embodiment, each cheering stick 23 further comprises a location tag. When the position coordinates of each cheering stick 23 with respect to the base stations are acquired, the UWB device 231 receives location beacons fed back by the base stations to obtain differences between the distances from the cheering stick 23 to the location base stations 21, and the processing devices 232 obtain fixed values of the position coordinates according to the differences between the distances from the cheering stick 23 and the location base stations 21.

In this embodiment, when the processing devices 23 convert the position coordinates into the display coordinates in the cheering stick array formed by the cheering sticks, the UWB devices receive a stadium seat mapping table sent by the location base stations first, wherein the position coordinates of the cheering sticks are converted into the display coordinates according to the stadium seat mapping table.

In this embodiment, after the UWB devices 231 acquire the animation data from the location base stations 21, the processing devices 232 generate play sequences according to the display coordinates of the cheering sticks and the animation data, and the display devices 233 emits light according to the play sequences. Each display device 233 comprises red, green and blue light beads for emitting light, and a control device for controlling a light emitting ratio of the light beads. Light in any color can be obtained by controlling the ratio of the red, green and blue light beads. The display devices 233 control the light emitting color and the light emitting time according to the play sequences.

Referring to FIG. 4, the invention further provides a system for controlling cheering sticks 23 to emit light based on a UWB location technology, comprising:

Location base stations 21 comprising wireless devices 213, the wireless devices 213 generating a wireless local area network to a target area;

The location base stations 21 send location beacons to all the cheering sticks 23 synchronously through the wireless local area network, and the location beacons are used to calculate position coordinates of the cheering sticks 23;

The location base stations 21 send animation data to the cheering sticks 23 through the wireless devices 213, and the animation data is used to enable all the cheering sticks 23 to emit light to realize an overall play effect.

In this embodiment, at least four location base stations 21 are set. Each location base station 21 comprises a first transmission device. At least one of the location base stations 21 is a main location base station 211, which comprises a first receiving device 214 and is in a communication connection with main control equipment 22 through the first receiving device 214. The other location base stations are in communication with the main location base station 211 through the first transmission devices 212. Wherein, before the location base stations 21 send the animation data to the cheering sticks 23, the first transmission device 212 of the main location base station 211 receives the animation data transmitted by main control equipment 22 first, and then transmits the animation data to the first transmission devices 212 of the other location base stations 21.

The invention has the following advantages:
1. The display coordinates of the cheering sticks with all IDs in the cheering stick array are obtained through the UWB location technology, and then the play sequences of the cheering sticks are obtained according to the animation data and the display coordinates, so that the cheering sticks emit light in a specific rule to fulfill an overall animation play effect, thus further igniting the atmosphere of a concert or a match.
2. Audience can sit on any seats after getting the cheering sticks, and the seats do not need to be numbered.

The embodiments disclosed above are merely several specific embodiments of the invention, and are not intend to limit the invention. All variations obtained by any skilled in the art should fall within the protection scope of the invention.

What is claimed is:

1. A method for controlling cheering sticks to emit light based on an ultra-wide band (UWB) location technology, comprising:
setting location base stations, and generating a wireless local area network by the location base stations to cover a target area;
after cheering sticks are connected to the wireless local area network generated by the base stations, acquiring beacons from the location base stations, and calculating positions of the cheering sticks to obtain position coordinates; and calculating display coordinates in a cheering stick array according to the position coordinates of the cheering sticks and a stadium seat mapping table obtained from the base stations; and
acquiring animation data from the location base stations by the cheering sticks, calculating play sequences of the cheering sticks according to the animation data and the display coordinates, and playing the play sequences synchronously to realize animation play of the cheering stick array;
wherein after the cheering sticks acquire the animation data from the location base stations, the play sequences of the cheering sticks are calculated according to the display coordinates of the cheering sticks, and the cheering sticks emit light in order according to the play sequences.

2. The method for controlling cheering sticks to emit light based on a UWB location technology according to claim 1, wherein the cheering sticks receive location beacons sent by the location base stations first, and then the position coordinates of the cheering sticks are calculated through a time difference of arrival (TDOA) algorithm.

3. The method for controlling cheering sticks to emit light based on a UWB location technology according to claim 2, wherein when the position coordinates of the cheering sticks are calculated through the TDOA algorithm, the stadium seat mapping table sent by the location base stations is received first; the stadium seat mapping table comprises a one-to-one corresponding relationship between position coordinates of all seats in a stadium and the display coordinates of the cheering sticks; and the position coordinates of the cheering sticks are calculated first, and then the display coordinates of the cheering sticks are obtained according to the position coordinates and the mapping table.

4. The method for controlling cheering sticks to emit light based on a UWB location technology according to claim 1, wherein when the position coordinates of the cheering sticks are converted to the display coordinates in the cheering stick array formed by the cheering sticks, the stadium seat mapping table sent by the location base stations is received first; wherein the stadium seat mapping table comprises a one-to-one corresponding relationship between position coordinates of all seats in a stadium and the display coordinates of the cheering sticks, and the position coordinates of the cheering sticks are converted into the corresponding display coordinates according to the mapping table.

5. The method for controlling cheering sticks to emit light based on a UWB location technology according to claim 1, wherein the cheering sticks receive play time signals sent by the location base stations before emitting light in order, and the play time signals are used to control the cheering sticks to start to emit light at a specific time.

6. A method for controlling cheering sticks to emit light based on an ultra-wide band (UWB) location technology, comprising:
    setting location base stations, and generating a wireless local area network by the location base stations to cover a target area;
    sending, by the location base stations, location beacons to all cheering sticks, the location beacons being used to calculate position coordinates of the cheering sticks; and
    sending, by the location base stations, animation data to the cheering sticks, the animation data being used to enable a cheering stick array to emit light to realize animation play;
    when the location base stations are set, the number of the location base stations is at least four;
    wherein the location base stations also send play time signals to the cheering sticks after sending the animation data to the cheering sticks, and the play time signals are used to control the cheering sticks to start to emit light at a specific time.

7. The method for controlling cheering sticks to emit light based on a UWB location technology according to claim 6, wherein the location base stations also send a stadium seat mapping table to the cheering sticks when sending the location beacons to all the cheering sticks, wherein the stadium seat mapping table comprises position coordinates and a display coordinate mapping table.

8. The method for controlling cheering sticks to emit light based on a UWB location technology according to claim 6, wherein at least one of the location base stations is a main location base station which is in a communication connection with main control equipment, and the other location base stations are all in a communication connection with the main location base station; when the location base stations send signals to the cheering sticks, the main location base station receives a signal from the main control equipment first and transmits the signal to the other location base stations, and then the main location base station or the location base stations transmit the signal to the cheering sticks.

9. A method for controlling cheering sticks to emit light based on an ultra-wide band (UWB) location technology, comprising:
    setting location base stations, and generating a wireless local area network by the location base stations to cover a target area;
    after cheering sticks are connected to the wireless local area network generated by the base stations, acquiring beacons from the location base stations, and calculating positions of the cheering sticks to obtain position coordinates; and calculating display coordinates in a cheering stick array according to the position coordinates of the cheering sticks and a stadium seat mapping table obtained from the base stations; and
    acquiring animation data from the location base stations by the cheering sticks, calculating play sequences of the cheering sticks according to the animation data and the display coordinates, and playing the play sequences synchronously to realize animation play of the cheering stick array;
    wherein when the position coordinates of the cheering sticks are converted to the display coordinates in the cheering stick array formed by the cheering sticks, the stadium seat mapping table sent by the location base stations is received first; wherein the stadium seat mapping table comprises a one-to-one corresponding relationship between position coordinates of all seats in a stadium and the display coordinates of the cheering sticks, and the position coordinates of the cheering sticks are converted into the corresponding display coordinates according to the mapping table.

* * * * *